July 9, 1968 D. M. BARTLEY 3,392,349
MASS PROXIMITY SENSOR

Filed Feb. 23, 1967 2 Sheets-Sheet 1

INVENTOR
DOUGLAS M. BARTLEY
BY *Cullen, Sloman, & Cantor*
ATTORNEYS

INVENTOR
DOUGLAS M. BARTLEY
BY Cullen, Sloman, i Cantor
ATTORNEYS

United States Patent Office 3,392,349
Patented July 9, 1968

3,392,349
MASS PROXIMITY SENSOR
Douglas M. Bartley, Detroit, Mich., assignor, by mesne assignments, to Application Engineering Corporation, Elk Grove Village, Ill., a corporation of Illinois
Filed Feb. 23, 1967, Ser. No. 617,875
5 Claims. (Cl. 331—65)

ABSTRACT OF THE DISCLOSURE

A mass proximity sensor of the capacitance type, which produces an amplified signal, useful to actuate controls, in response to a change in oscillation produced by an oscillator circuit containing a capacitance type sensing element or probe whose capacitance varies, thus varying oscillation, in response to changes in the dielectric constant of material adjacent to the sensing element. The effects upon the circuit due to changes in temperature and environment are accurately compensated for by a variable resistor arranged between the oscillator circuit and ground. Also, the oscillator circuit may be positioned remotely, a considerable distance from its amplifier circuit, power source, and compensation variable resistor, thereby utilizing the sensor for remote control actuation of devices located remotely from the sensor and permitting remote adjustments of the sensor circuitry.

---

Electronic capacitance responsive sensing circuits have been used in the past to sense or detect masses of material. For example, these devices have been used in storage bins or tanks to detect the level of the contents, such as a powder or liquid, and react to the presence or absence of such material by changing capacitance which in turn changes the oscillation of an oscillation circuit connected thereto to thereby produce a signal which may be utilized for any number of purposes. For example, such signal may be used to actuate a relay which calls for emptying or filling a storage tank, depending upon the use of the detector, etc.

An example of such device is shown and described in the patent to Rosso, No. 3,067,364 granted December 4, 1962.

Such devices require, in general, an oscillator circuit, an amplifier and a DC power source, usually in the form of a circuit for converting available AC to DC as a power supply.

The prior art devices have two serious shortcomings. The first is that it has not been possible to transmit the oscillation signal of the oscillator circuit any distance to the amplifier, which meant that the oscillator circuit, the amplifier and the power circuits all had to be located in the same physical location in order to permit obtaining a useable signal. In addition, these had to be in close conjunction to the actual physical sensing probe, which, in terms of a physical device, resulted in the entire circuitry and physical parts being located at the place where the sensing or detecting was to take place. This prevented the use of such devices as a remote control device wherein the sensing or detection portion could be used, by separating the above elements, to actuate controls located any considerable distance from the sensing location. For example, in the case of a storage silo, it has not been possible to separate the parts physically by any considerable distance so as to permit sensing in the tank and remote operation or signal receiving at a control room at a considerable distance from the tank, such as five hundred or more feet. Hence, other types of devices had to be used for remote control purposes, limiting the usefulness of this type of sensing apparatus.

A second shortcoming, is that these electronic devices, particularly since they include solid state diodes and transistors have been highly sensitive to temperature changes, aggravated by the fact that the effect of temperature on the various main portions of the circuit tend to blow up or amplify each other so as to provide additive errors due to temperature changes.

The only adjustments available for such circuitry have been the use of variable capacitors located in the circuit which required manually adjusting the circuitry at the physical location of the device, which could very well be in some almost inaccessible area on a large storage tank or the like. Thus, adjustment has been both inconvenient and difficult in order to adjust the circuits for ambient temperatures and in addition, such adjustments have been by no means satisfactory to compensate for the effect of temperature changes, particularly of a severe nature. Hence, again, the uses of these devices have been limited to a considerable extent to areas and places where temperature remains relatively constant or at least where there have been no severe changes of temperature.

In light of the foregoing, it is an object of this invention to provide a capacitance type mass proximity sensor so constructed that the oscillation circuit is separate from and may be physically remote from the amplification circuit and power circuit, even by considerable distances such as five hundred or more feet, to permit remote control and remote signalling and secondly, to provide an adjustment means to compensate for temperature which means may be remotely located from the circuits for thereby controlling and resetting the circuits from a control area considerably remote from the circuits and sensing element.

A further object of this invention is to provide an electronic, solid state type of capacitance responsive detection circuit comprising an oscillation circuit, a separate amplification circuit and a separate power supply circuit with a temperature compensating adjustment means in the form of a simple variable resistor located between the oscillation circuit and ground, which resistor may be located at a considerable distance from the remaining circuitry for control purposes.

These and other objects and advantages of this invention will become apparent upon reading the following description, of which the attached drawings form a part.

Referring to these drawings.

GENERAL CONSTRUCTION

Figure 3:
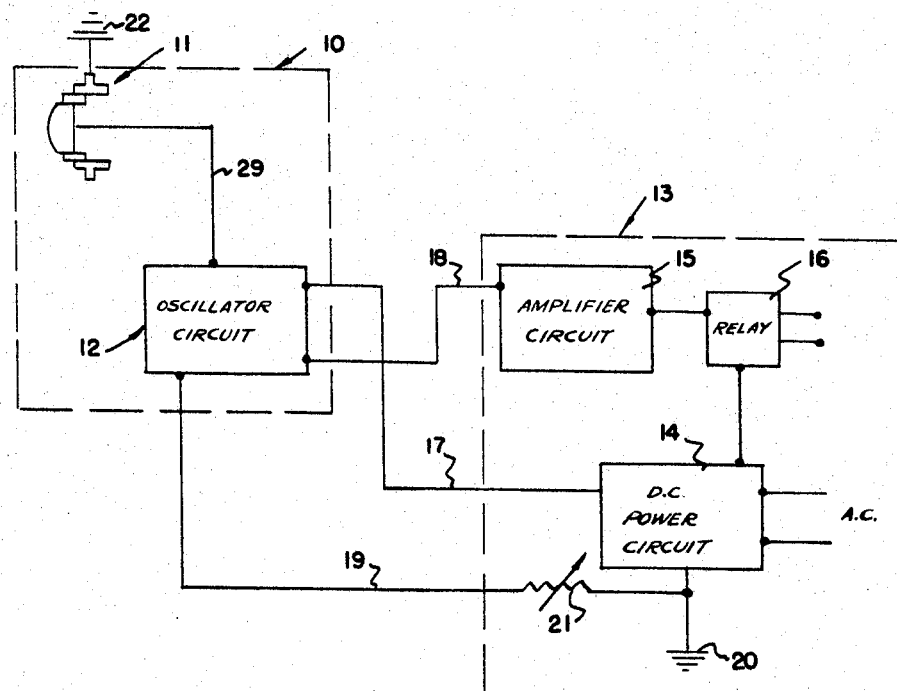
FIG. 3 is a simplified, schematic circuit diagram showing the general arrangement of the oscillator, amplifier and power circuits.

With reference to FIG. 3, the device herein comprises two generally separate parts, namely, a sensing or detection part 10 (indicated in dotted lines), comprising a sensing element or probe 11 and an oscillator circuit 12, and a remote power-amplifier package 13 (shown in dotted lines) comprising a D.C. power circuit 14, an amplifier circuit 15 and a signal actuated means, such as a relay 16. The power circuit 14 and the amplifier circuit 15 are connected by means of wires 17 and 18, respectively, which may be as long as necessary, to the oscillator circuit 12.

The oscillator circuit is connected by a wire 19 to ground at 20, through a variable resistor 21 for remotely controlling and compensating for the effects of temperature changes upon the circuit. In addition, the sensing element 11 is separately connected to ground at 22.

SENSING ELEMENT

Figure 1:
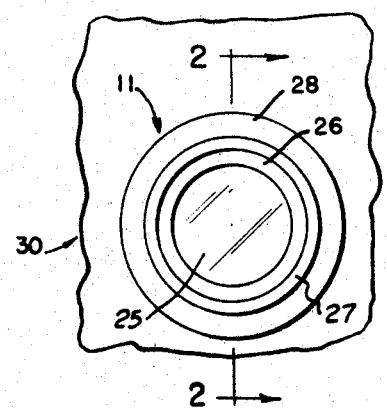
FIG. 1 is a front elevational view of the sensing element or probe mounted upon a tank wall.
Figure 2:
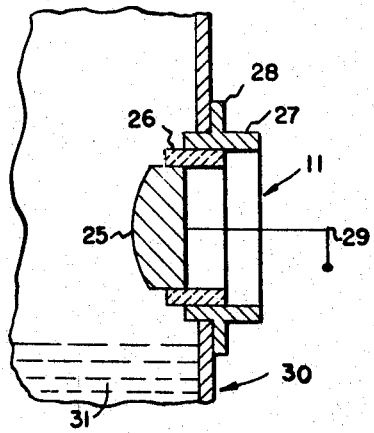
FIG. 2 is a cross-sectional view of the sensing element, with a portion of the tank, taken in the direction of arrows 2—2 of FIG. 1

Referring to FIGS. 1 and 2, the sensing element 11 is formed of a probe or plate 25, disk shaped, surrounded by an insulating ring 26, in turn surrounded by a metal conductive ring 27 having an outer mounting flange 28. The plate 25 is connected by a probe wire 29 to the oscillator circuit. The outer ring 27 is connected by its flange 28, using suitable bolts or other mechanical fastening means, to the equipment where sensing is to take place, such as to the wall of a storage tank or silo 30 containing a mass of material 31. In this case, the sensing device is arranged to detect the level of the mass within the tank and signals when the mass comes close to the plate 25, such as a few inches away therefrom.

The sensing element can also be arranged so as to detect the absence of mass, that is, it can normally be covered by the mass of material such as a liquid or a solid or powder and upon withdrawal of the mass from the area of the sensing device, it will detect and result in a signal from the circuitry. As can be seen, the presence or absence of the mass results in a change of the dielectric constant of the material adjacent to the sensor and it is this change in dielectric constant which effects the capacitance of the probe or sensing element.

OSCILLATOR CIRCUIT

Figure 4:
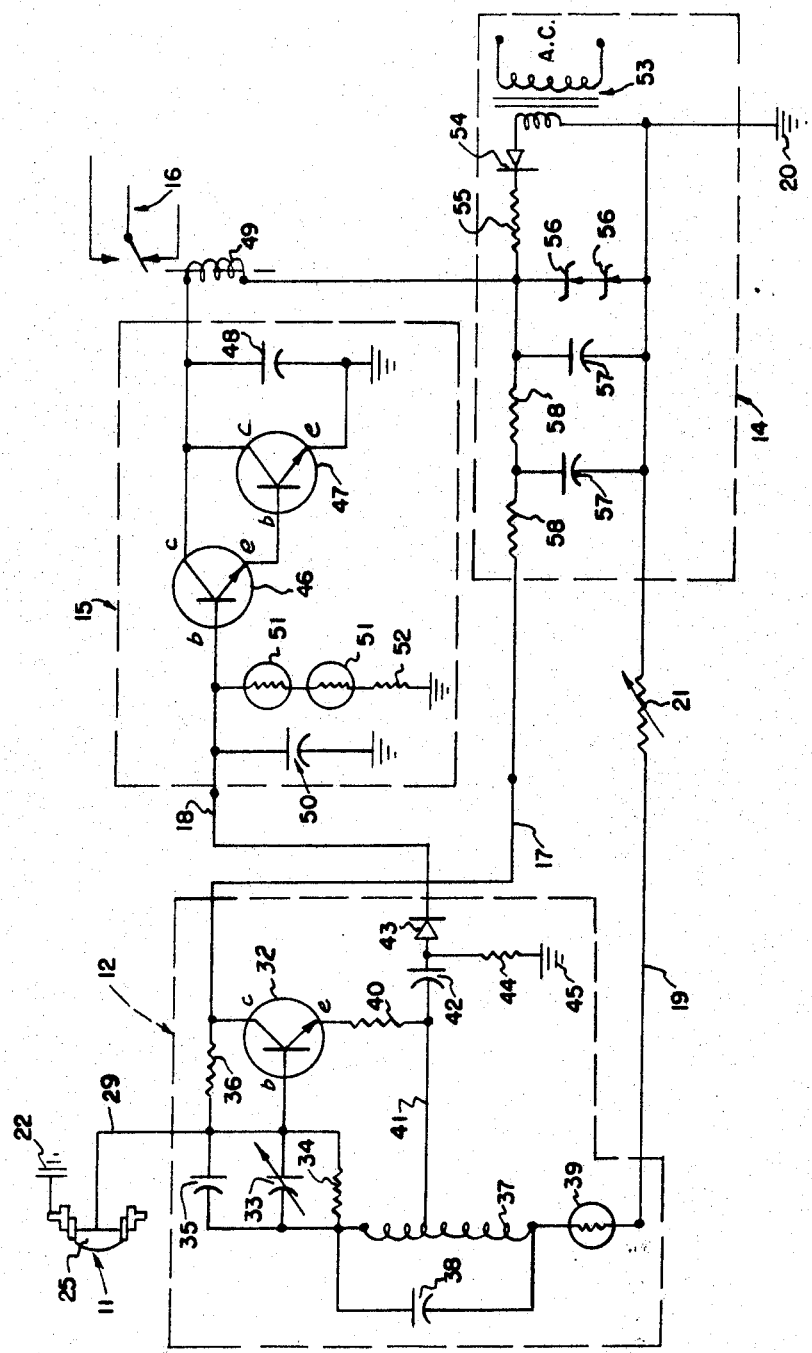
FIG. 4 is a schematic diagram of the various electrical elements forming the complete circuitry.

Referring to FIG. 4, the oscillator circuit (shown surrounded by dotted lines) comprises a transistor 32 whose base is connected to an RC network consisting of a variable capacitor 33 arranged in parallel with a resistor 34. These are connected in parallel with a capacitor 35, in turn connected to the collector of the transistor 32, through feedback resistor 36.

The foregoing network is connected in series to a parallel resonant circuit comprising an inductance coil 37 in parallel with a capacitor 38. The resonant circuit in turn is connected through a thermistor 39 to the ground wire 19, the variable resistor 21, and ground 20.

The emitter (*e*) of transistor 32 is connected through a resistor 40 and wire 41 to the oscillator coil 37 and also to a coupling capacitor 42 and rectifier diode 43 between which is connected a resistor 44 secured to ground at 45, with the output oscillator signal coming out of the diode 43 and travelling through the connecting wire 18 to the amplifier circuit 15.

AMPLIFIER CIRCUIT

The amplifier circuit 15 comprises a pair of transistors 46 and 47, with the base of transistor 47 connected to the emitter of transistor 46. The collectors of the two transistors are connected together and then to a coil 49 of the relay 16, and in addition, a filtering capacitor 48 is arranged in parallel with the collector and emitter connections of the transistor 47, and is also grounded as shown in FIG. 4.

Connected to the transistor 46 is first a filtering capacitor 50 which is grounded and secondly, a pair of series connected thermistors 51, connected through a resistor 52 to ground.

D.C. POWER CIRCUIT

The D.C. power circuit 14 (surrounded by dotted lines in FIG. 4) comprises a transformer 53 which converts an A.C., house current supply to D.C. of a lower voltage, such as in the order of 17 volts or so. The secondary coil of the transformer is connected at one end to ground 20 and at its opposite end, in series, to a diode 54, a resistor 55, in turn parallel connected to a pair of Zener diodes 56 which function to maintain substantially constant voltage.

A filter network is also provided, in the form of a pair of capacitors 57 and resistors 58, with the complete circuit thereby producing a relatively low voltage which is substantially constant and with direct current.

OPERATION

In operation, the power circuit 14 is operated to provide the necessary DC power to the oscillator circuit 12. Initially, the variable capacitor 33 in the RC network is adjusted to produce a normal oscillating signal, with further adjustments being made by adjusting the remotely located variable resistor 21. In this condition, the sensing element has a base or normal capacitance and the oscillator circuit produces a normal or base signal or even no signal, as connected.

Normally, the coupling capacitor 42 blocks the flow of DC but passes AC so that a signal passes through the diode 43 to the amplifier circuit and the signal is suitably amplified and filtered through the two transistors, etc., to provide a fixed signal at the relay 16 or other signal actuated device. For example, this signal could actuate the coil 49 of the relay and hold it in one of its two positions.

When conditions are changed at the sensing element, such as when material in the form of a powder which has covered and surrounded the sensing element, has been withdrawn, that is, the level has dropped, or vice versa, as the case may be, the capacitance of the sensing element, being changed, results in a change in the signal of the oscillator circuit, in turn amplified through the amplification circuit, thereby changing the signal to the signal actuator device and as in the case of a relay, causing the relay to switch to a second position.

A practical example of the use of this device would be, for example, as a water level indicator in the bilge of a boat. The sensing element could be located at a fixed distance above the base of the bilge and when the water fills up to the sensing element, the signal produced would operate a relay, in turn turning on automatically the boat pumps to pump out the bilge and cause the water level to drop again. A similar practical example can be seen in maintaining the level of a storage tank or silo used in storing material for reuse or for productive use in some sort of process located nearby.

This invention may be further developed within the scope of the following claims. Accordingly, it is desired that the foregoing description be read as being merely illustrative of an operative embodiment and not in a strictly limited sense.

Having fully described an operative embodiment of this invention, I now claim:

1. A mass sensor comprising a capacitance type sensing element having one side connected, through ground, to a source of DC power, and another side connected to an oscillator circuit comprising a transistor whose base is connected to an adjustable RC network in turn connected to a parallel resonant circuit which is connected through a variable resistor to ground;

the emitter of the transistor being connected to the inductance coil of the parallel resonant circuit and through a coupling capacitor to an amplifier circuit for amplifying the signal from the oscillator circuit;

the collector of the transistor being connected to the sensing element and to said source of DC power;

and signal receiving means connected to the amplifier for actuation in response to changes in the signal from the oscillator circuit resulting from changes in capacitance in the sensing element due to changes in dielectric constant in the area in which the sensing element is positioned.

2. A device as described in claim 1, and said variable resistor being remotely located relative to said oscillator circuit.

3. A device as described in claim 1, and said variable resistor, amplifier and DC power source all being physically separated from and remotely located relative to said oscillator circuit and being electrically connected thereto by conductive wires.

4. A device as described in claim 1, and including a capacitor series connected to a feedback resistor, with the capacitor arranged in parallel with the RC network and the resistor connected between the transistor collector and sensing element;

and a rectifier connected between said coupling capacitor and amplifier, with a resistor connected from the junction of said capacitor and said rectifier to ground.

5. A device as described in claim 4, and including a thermistor connected between said parallel resonant circuit and said variable resistor.

References Cited

UNITED STATES PATENTS 2,888,945  6/1959  Marlow _____ 331—65 X
3,042,908  7/1962  Pearson _____ 331—65 X ROY LAKE, *Primary Examiner.*

S. H. GRIMM, *Assistant Examiner.*